United States Patent
Lee et al.

(10) Patent No.: US 10,588,112 B2
(45) Date of Patent: Mar. 10, 2020

(54) METHOD AND APPARATUS FOR TRANSMITTING AND RECEIVING A SIGNAL IN A WIRELESS COMMUNICATION SYSTEM SUPPORTING A RELAY UE

(71) Applicant: LG ELECTRONICS INC., Seoul (KR)

(72) Inventors: Ki-Dong Lee, San Diego, CA (US); Sanggook Kim, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 15/870,636

(22) Filed: Jan. 12, 2018

(65) Prior Publication Data

US 2018/0310293 A1 Oct. 25, 2018

Related U.S. Application Data

(60) Provisional application No. 62/487,982, filed on Apr. 20, 2017, provisional application No. 62/534,165, filed on Jul. 18, 2017.

(51) Int. Cl.
*H04W 72/04* (2009.01)
*H04W 76/14* (2018.01)
*H04W 88/04* (2009.01)

(52) U.S. Cl.
CPC ....... *H04W 72/0406* (2013.01); *H04W 76/14* (2018.02); *H04W 88/04* (2013.01)

(58) Field of Classification Search
None
See application file for complete search history.

(56) References Cited

U.S. PATENT DOCUMENTS

| | | | |
|---|---|---|---|
| 2002/0196785 A1* | 12/2002 | Connor | H04L 47/10 370/392 |
| 2014/0112140 A1* | 4/2014 | Chan | H04L 41/5022 370/235 |
| 2018/0139694 A1* | 5/2018 | Folke | H04W 48/20 |
| 2019/0149303 A1* | 5/2019 | Yilmaz | H04L 5/0055 |

* cited by examiner

*Primary Examiner* — Anh Ngoc M Nguyen
(74) *Attorney, Agent, or Firm* — Lee Hong Degerman Kang Waimey

(57) ABSTRACT

Disclosed herein is a method for transmitting and receiving a signal in a wireless communication system supporting a Relay UE. The method performed by the Relay UE comprises determining whether or not to serve a connection request for a Remote UE using at least one of first control information related to a current state of the Relay UE, second control information indicating a type of traffic to be supported, and third information indicating a current load state of the Relay UE; and transmitting the determination result to at least one Remote UE.

14 Claims, 8 Drawing Sheets

[Fig. 1]
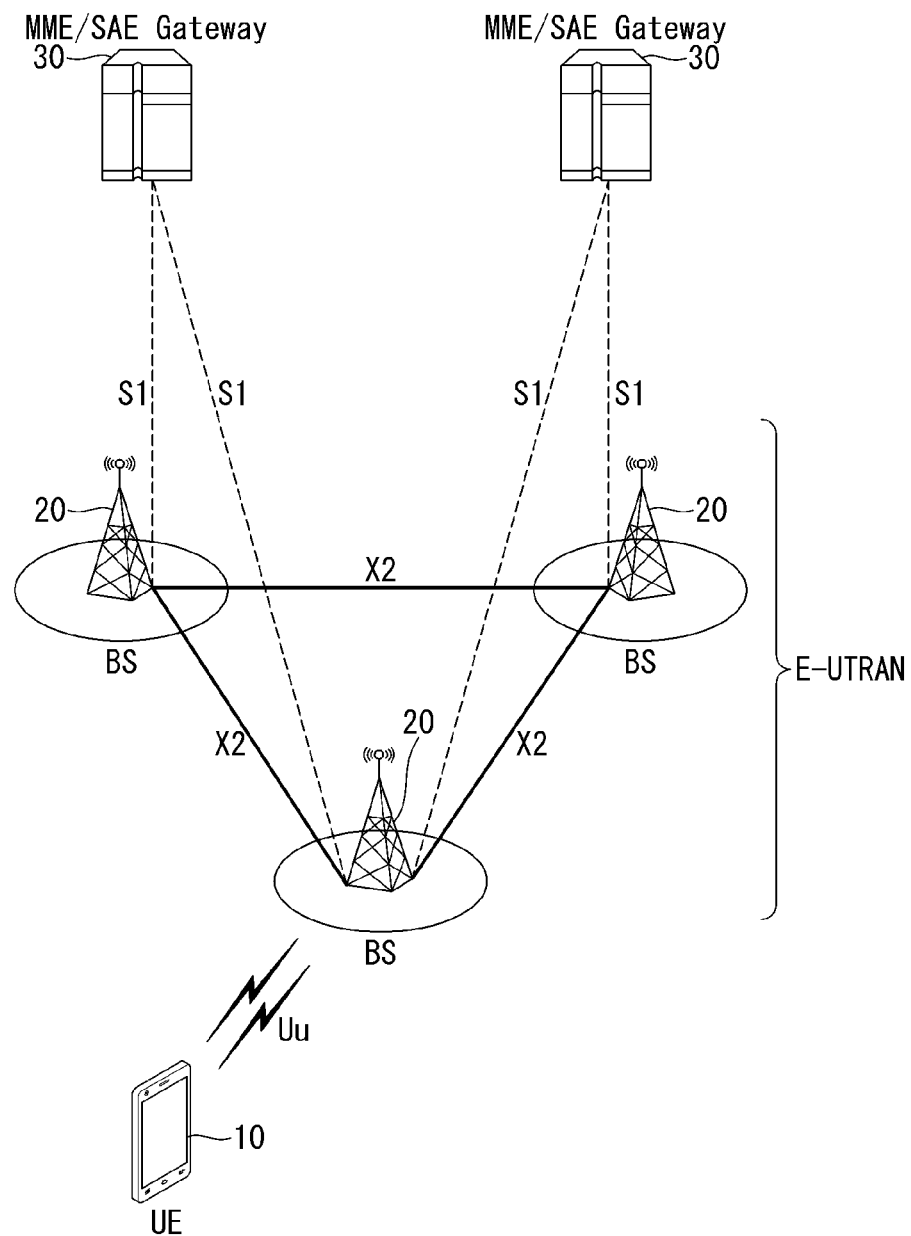

[Fig. 2]
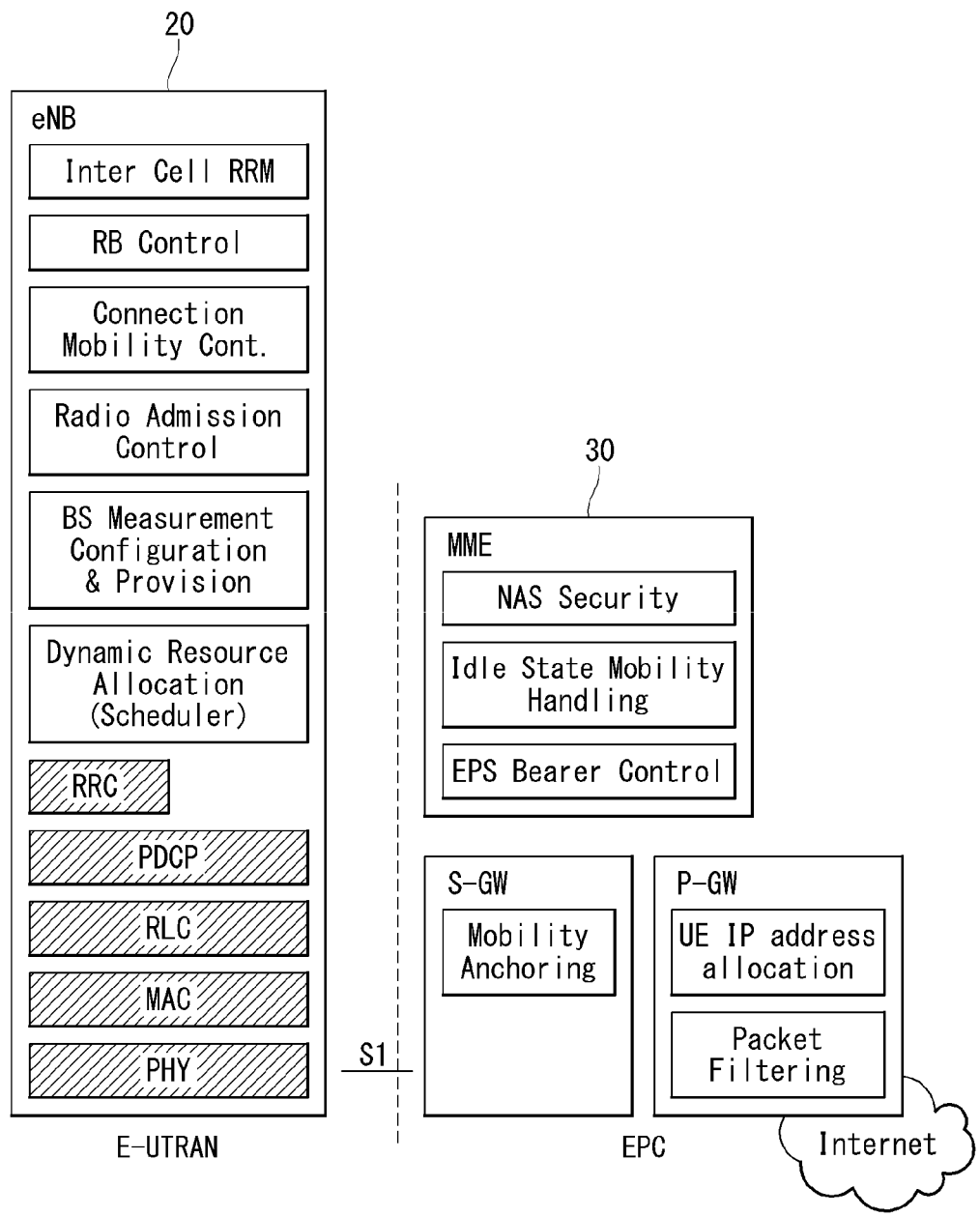

[Fig. 3a]
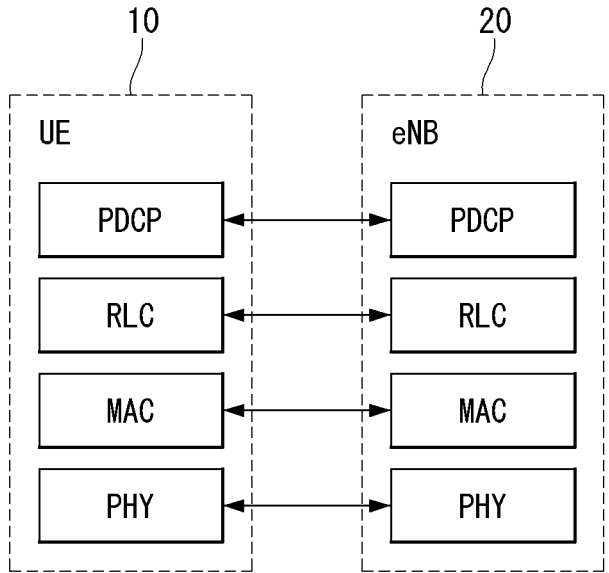
[Fig. 3b]
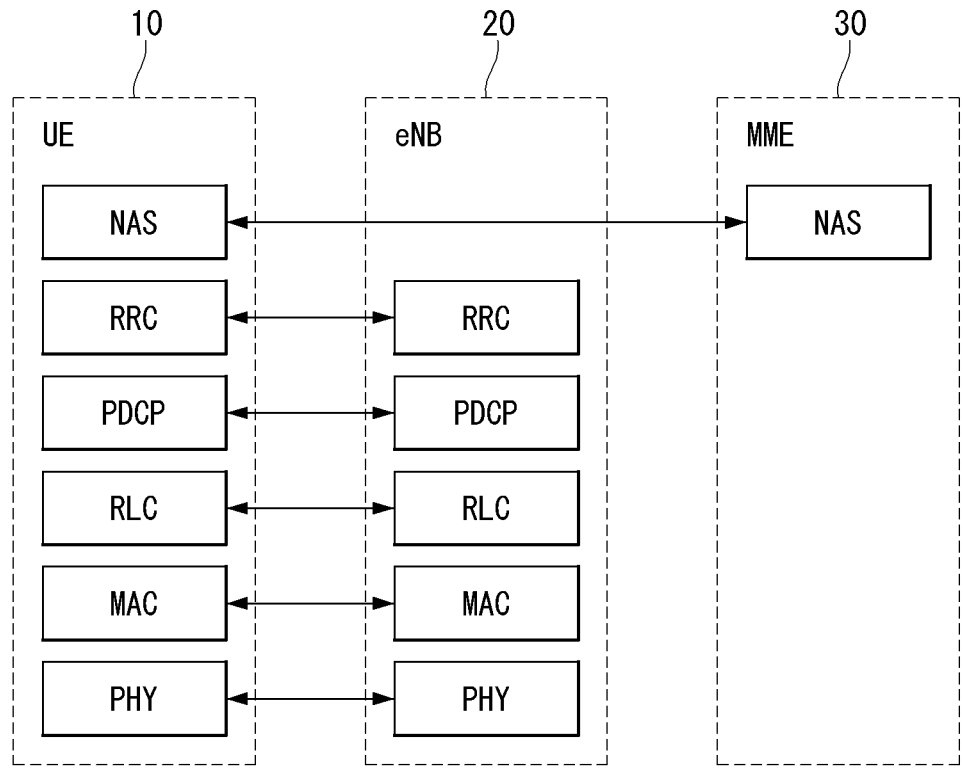

[Fig. 4]
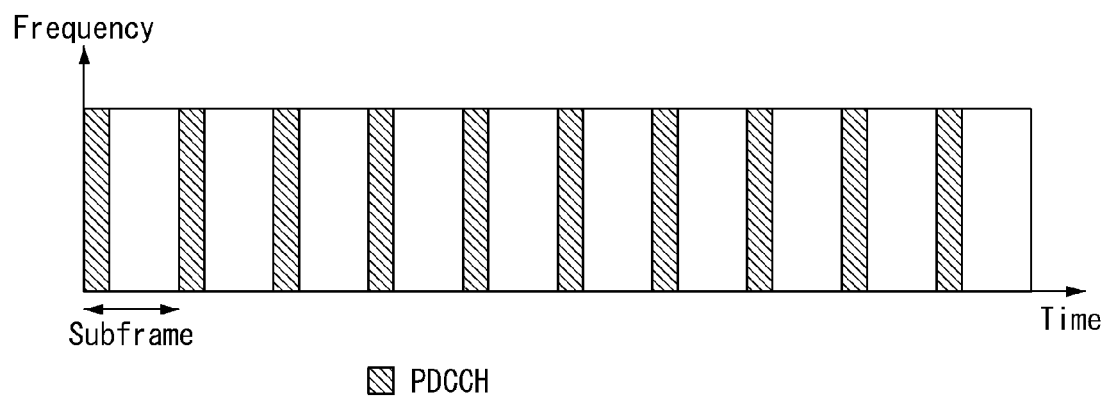
[Fig. 5]
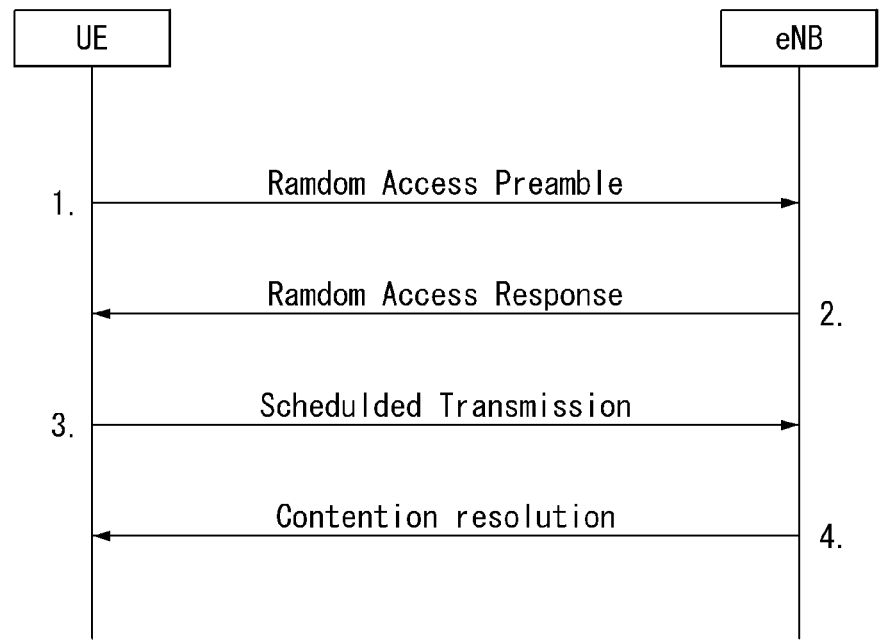

[Fig. 6]
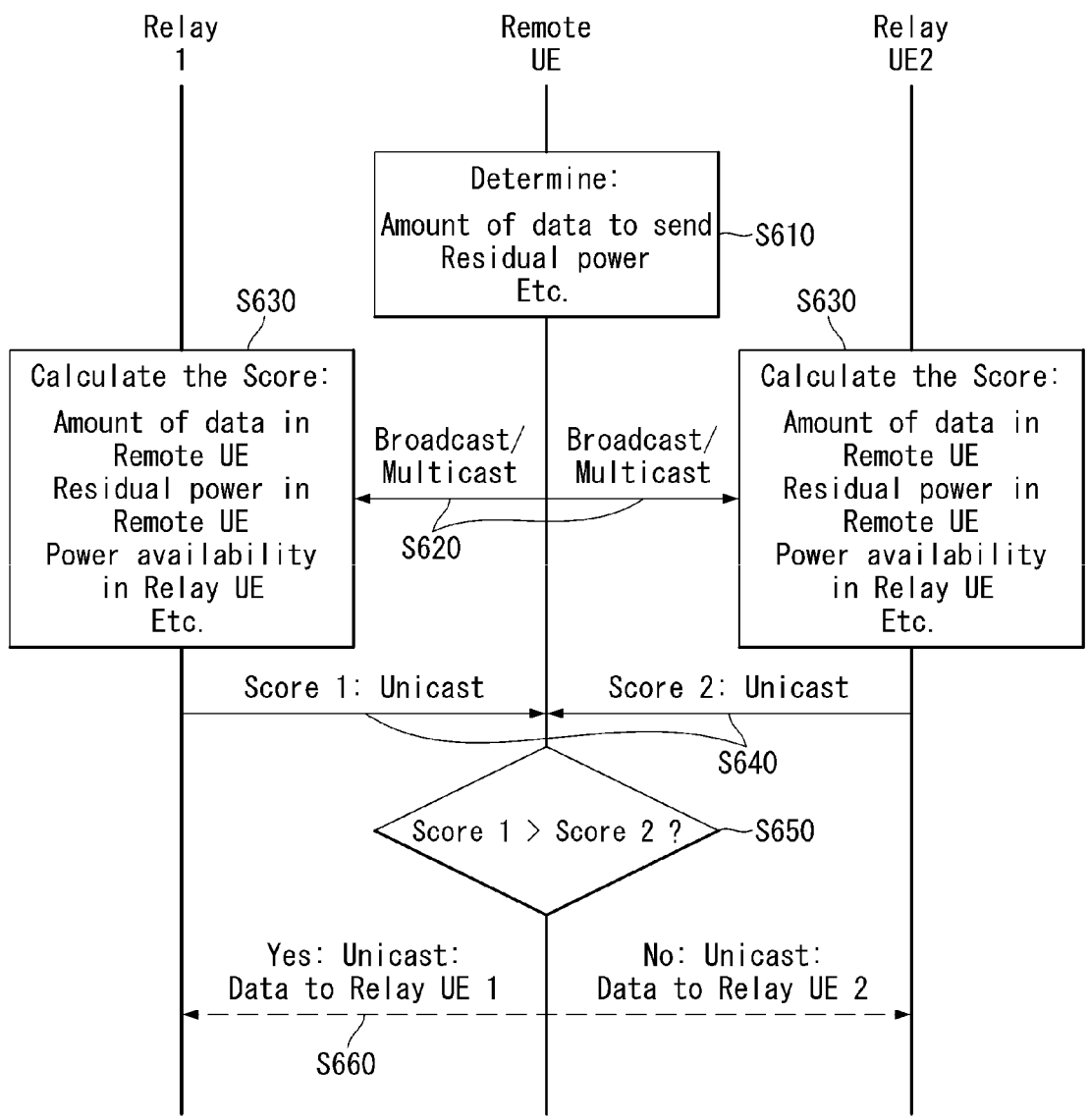

[Fig. 7]
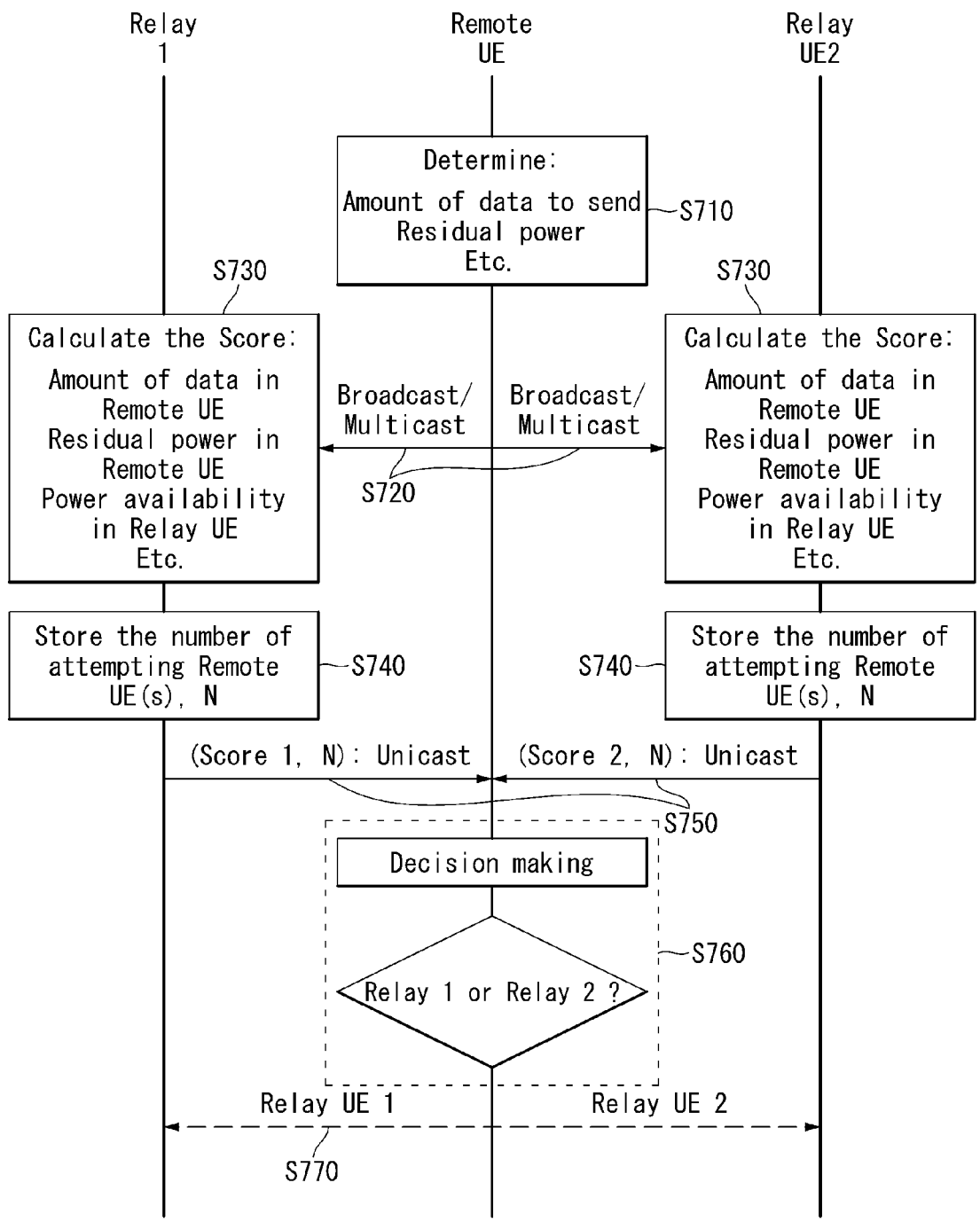

[Fig. 8]
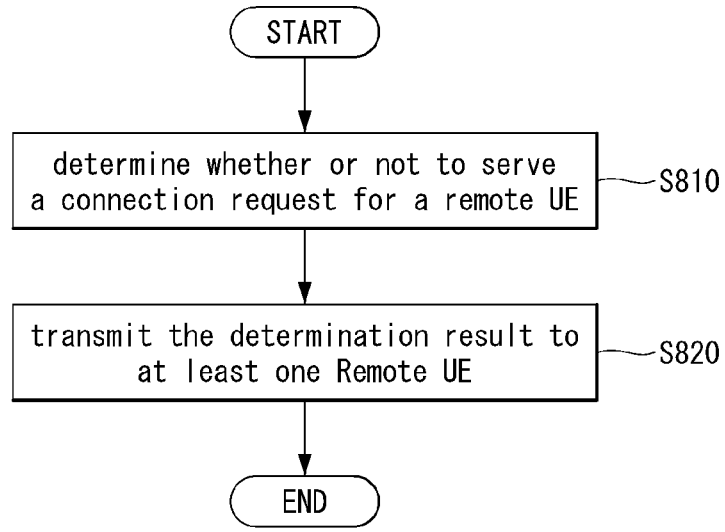
[Fig. 9]
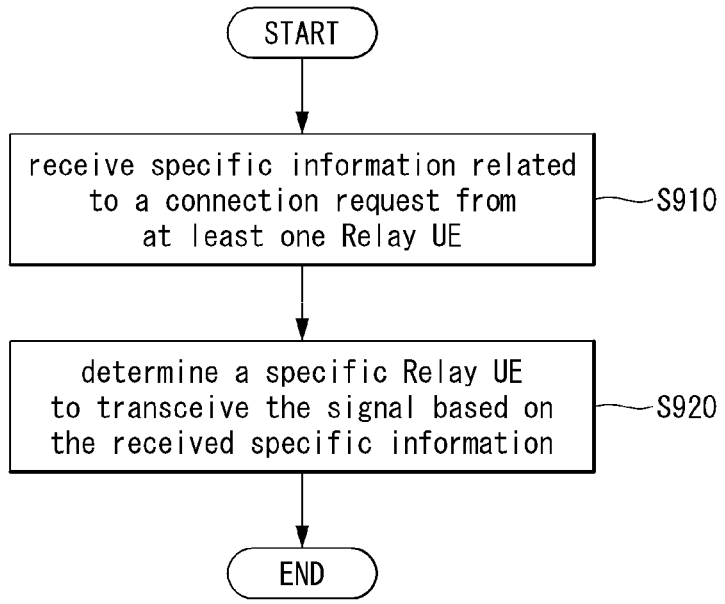

[Fig. 10]
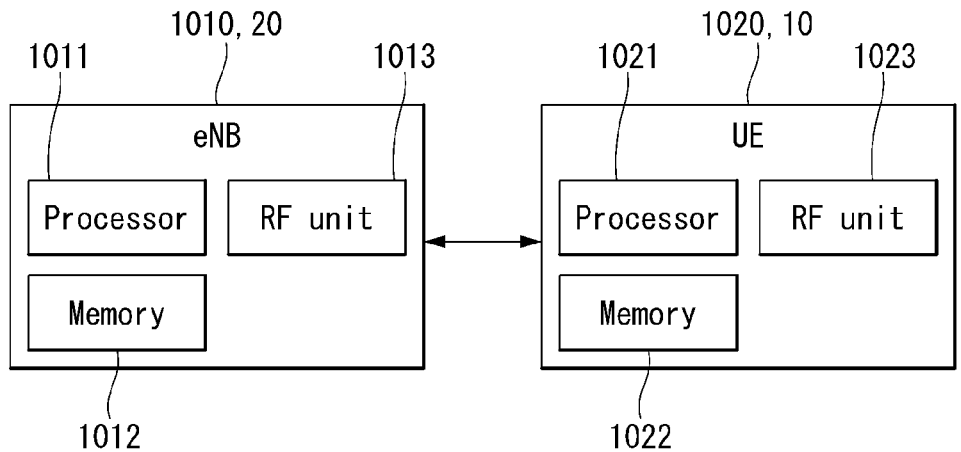
[Fig. 11]
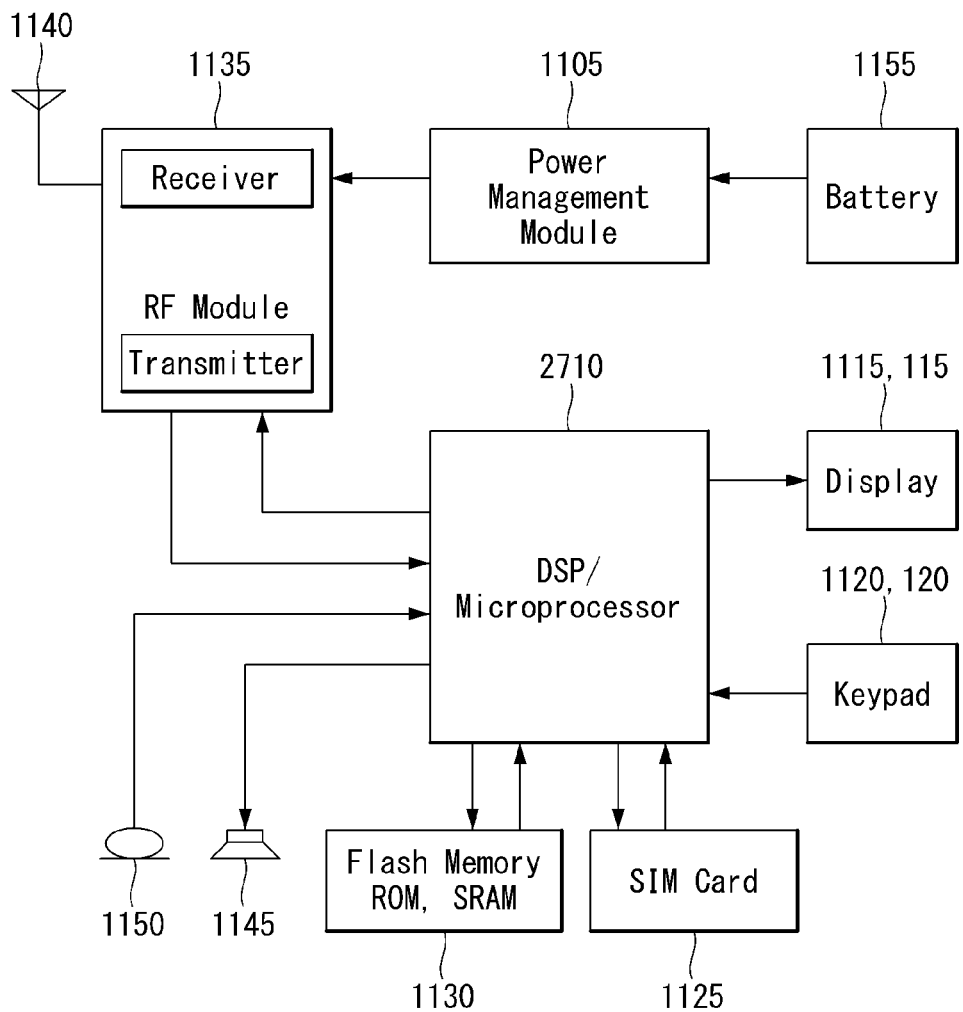

METHOD AND APPARATUS FOR TRANSMITTING AND RECEIVING A SIGNAL IN A WIRELESS COMMUNICATION SYSTEM SUPPORTING A RELAY UE

CROSS-REFERENCE TO RELATED APPLICATION

Pursuant to 35 U.S.C. § 119(e), this application claims the benefit of U.S. Provisional Patent Application Nos. 62/487,982, filed on Apr. 20, 2017 and 62/534,165, filed on Jul. 18, 2017, the contents of which are all hereby incorporated by reference herein in their entirety.

BACKGROUND OF THE INVENTION

Field of the Invention

The present invention relates to a method for transmitting and receiving a signal in a wireless communication system and, more particularly, to a method and apparatus for transmitting and receiving the signal between a Relay UE and a Remote UE using sidelink.

Related Art

Mobile communication systems have been developed to provide voice services while assuring users' activities and mobility. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support including unlicensed bands, or device networking.

SUMMARY OF THE INVENTION

An object of this specification is to provide a method for transceiving data using an interactive operation between a Remote UE and a Relay UE.

An object of this specification is to provide a method for calculating a score to determine a specific Relay UE transceiving data with a Remote UE.

An object of this specification is to provide a method for using a priority related information of a traffic type to determine a specific Relay UE transceiving data with a Remote UE.

Objects to be achieved in this specification are not limited to the aforementioned advantages, and those skilled in the art to which the present invention pertains may evidently understand other objects from the following description.

This specification provides a method for transmitting and receiving a signal in a wireless communication system supporting a Relay UE.

The method performed by the Relay UE comprises determining whether or not to serve a connection request for a Remote UE using at least one of first control information related to a current state of the Relay UE, second control information indicating a type of traffic to be supported, and third information indicating a current load state of the Relay UE; and transmitting the determination result to at least one Remote UE, wherein the first control information includes at least one of information for a channel state with the Remote UE, information for power available in the Relay UE, or information for a link state with a base station, wherein the third control information includes at least one of information for the number of currently connected Remote UEs or information for the number of Remote UEs attempting to connect for a specific time.

Furthermore, in this specification, the determination result indicates that the Remote UE can serve or cannot serve the connection request of the Remote UE.

Furthermore, in this specification, the determination result is a score value, wherein the score value is calculated by applying a priority and a weight to each information included in the first control information, the second control information, and the third control information, or wherein the score value is calculated by applying a priority and a weight to each of the first control information, the second control information, and the third control information.

Furthermore, in this specification, the higher the calculated score, the higher the priority.

Furthermore, in this specification, the determination result includes a priority level represented by a bit string.

Furthermore, in this specification, a first bit of the bit string has the highest priority level and the priority level is lower from the next bit.

Furthermore, in this specification, the priority level is broadcast to the at least one Remote UE.

Furthermore, this specification further comprises receiving, from the at least one Remote UE, fourth control information including at least one of information for an amount of data to be transmitted or information for remaining battery power.

Furthermore, in this specification, the determining whether or not to serve the connection request for the Remote UE uses at least one of the first control information, the second control information, the third control information, or the fourth control information.

Furthermore, in this specification the method performed by a Remote UE comprises receiving specific information related to a connection request from at least one Relay UE; and determining a specific Relay UE to transceive the signal based on the received specific information, wherein the specific information includes at least one of first control information related to a current state of the Relay UE, second control information indicating a type of traffic supported by the Relay UE, or third information indicating a current load state of the Relay UE, wherein the first control information includes at least one of information for a channel state with the Remote UE measured by the Relay UE, information for power available in the Relay UE, or information for a link state between the Relay UE and a base station, wherein the third control information includes at least one of information for the number of Remote UEs currently connected to the Relay UE or information for the number of Remote UEs attempting to connect to the Relay UE for a specific time.

Furthermore, in this specification, the Relay UE comprises a radio frequency (RF) module configured to communicate with the outside in a wireless or a wired manner; and a processor functionally connected to the RF module, wherein the processor is configured: to determine whether or not to serve a connection request for a Remote UE using at least one of first control information related to a current state of the Relay UE, second control information indicating a type of traffic to be supported, and third information indicating a current load state of the Relay UE; and to transmit the determination result to at least one Remote UE, wherein the first control information includes at least one of information for a channel state with the Remote UE, information for power available in the Relay UE, or information for a link state with a base station, wherein the third control information includes at least one of information for the number of currently connected Remote UEs or information for the number of Remote UEs attempting to connect for a specific time.

The present specification defines a method for determining a Relay UE to transceive data with a Remote UE, so that the Remote UE can transceive the data to a network via the determined Relay UE.

Advantages to be obtained in this specification are not limited to the aforementioned advantages, and those skilled in the art to which the present invention pertains may evidently understand other advantages from the following description.

BRIEF DESCRIPTION OF THE DRAWINGS

FIG. 1 illustrates a block diagram illustrating network structure of an evolved universal mobile telecommunication system (E-UMTS).

FIG. 2 illustrates a block diagram depicting architecture of a typical E-UTRAN and a typical EPC.

FIG. 3a illustrates the user-plane protocol for the E-UMTS.

FIG. 3b illustrates the control-plane protocol stack for the E-UMTS

FIG. 4 illustrates a Structure of the physical channel.

FIG. 5 illustrates a Random Access procedure for E-UTRAN initial access.

FIG. 6 is a flowchart illustrating an example of a method of calculating a score to determine a Relay UE, as proposed in the present invention.

FIG. 7 is a flowchart illustrating another example of a method of calculating a score to determine a Relay UE, as proposed in the present invention.

FIG. 8 is a flowchart illustrating an example of a method in which a Relay UE operates to determine a particular Relay UE so as to perform an interactive operation between the Remote UE and the Relay UE, as proposed in the present invention.

FIG. 9 is a flowchart illustrating an example of a method in which a Remote UE operates to determine a Relay UE so as to perform an interactive operation between the Remote UE and the Relay UE, as proposed in the present invention.

FIG. 10 is a block diagram illustrating a wireless device in which methods as proposed herein may be implemented.

FIG. 11 illustrates a block diagram of a wireless device according to an example of the present specification.

DESCRIPTION OF EXEMPLARY EMBODIMENTS

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a "station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A Pro is an evolution of 3GPP LTE-A. 5G NR is a revolution of 3GPP LTE-A that will be implemented by OFDMA or its variants.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2 is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIGS. 3a and 3b are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3a, the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 3b, the RLC and MAC layers (terminated in an eNodeB 20 on the network side) perform the same functions for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling.

The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area and may perform PLMN selection and cell re-selection. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

A physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, can be used for downlink control channel (PDCCH). PDCCHs carries dynamic allocated resources, such as PRBs and MCS.

A transport channel transfers signaling and data between the L1 and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming.

The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multicast Traffic Channel (MTCH). The DTCH is a point-to-point channel, dedicated to one UE for the transfer of user information and can exist in both uplink and downlink.

The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

It is known that different cause values may be mapped on the signature sequence used to send messages between a UE and eNB and that either Channel Quality Indicator (CQI) or path loss and cause or message size are candidates for inclusion in the initial preamble.

FIG. 5 illustrates different messages exchanged between a UE and eNB during initial access.

When a UE wishes to access the network and determines a message to be transmitted, the message may be linked to a purpose and a cause value may be determined. The size of the ideal message number 3 illustrated in FIG. 5 may also be determined by identifying all optional information and different alternative sizes, such as by removing optional information, or an alternative "scheduling request" message may be used.

The UE acquires necessary information for the transmission of the preamble, UL interference, Pilot Transmit power and required Signal-to-Noise Ratio (SNR) for the preamble detection at the receiver or combinations thereof. This information must allow the calculation of the initial transmit power of the preamble. It is beneficial to transmit the uplink message in the vicinity of the preamble from a frequency point of view in order to ensure that the same channel is used for the transmission of the message.

The UE should take into account the uplink interference and the uplink path loss in order to ensure that the network receives the preamble with a minimum SNR. The uplink interference can be determined only in the ENodeB and, therefore, must be broadcast by the ENodeB and received by the UE prior to the transmission of the preamble.

The uplink path loss can be considered to be similar to the downlink path loss and can be estimated by the UE from the received Rx (receiver) signal strength when the transmit power of some pilot sequence of the cell is known to the UE.

The required uplink SNR for the detection of the preamble would typically depend on the NodeB configuration, such as a number of Rx antennas and receiver performance.

There may be advantages to transmitting the rather static Transmit power of the pilot and the necessary uplink SNR separately form the varying uplink interference and possibly the power offset required between the preamble and the message.

The initial transmission power of the preamble can be roughly calculated according to the following formula:

Transmit power=TransmitPilot−RxPilot+ULInterference+Offset+SNRRequired.

Therefore, any combination of SNRRequired, ULInterference, TransmitPilot and Offset can be broadcast. In principle, only one value must be broadcast. This is essentially the method in current UMTS systems, although the UL interference in LTE will mainly be neighboring cell interference that is probably more constant than in UMTS.

The UE determines the initial uplink transmit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power for the preamble is not adequate. Another preamble will most likely be transmitted if no acknowledgement or a negative acknowledgement is received by the UE before the next random access attempt. The transmit power of the preamble can be increased, and/or the preamble can be transmitted on a different uplink frequency in order to increase the probability of detection.

Therefore, the actual transmit power of the preamble that will be detected does not necessarily correspond to the initial transmit power of the preamble as initially calculated by the UE.

The UE must determine the possible uplink transport format.

The transport format, which may include Modulation and Coding Scheme (MCS) and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the UE since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the UE according to the received preamble because the UE transmit power compared to the maximum allowed or possible UE transmit power is not known to the eNB, given that the UE will most likely consider the measured path loss in the downlink or some equivalent measure for the determination of the initial preamble transmission power.

The eNB could calculate a difference between the path loss estimated in the downlink compared and the path loss of the uplink. However, this calculation is not possible if power ramping is used and the UE transmit power for the preamble does not correspond to the initially calculated UE transmit power.

Furthermore, the precision of the actual UE transmit power and the transmit power at which the UE is intended to transmit is very low. Therefore, it has been proposed to code the path loss or CQI estimation of the downlink and the message size or the cause value in the uplink in the signature.

Proximity-Based Services

The Study of Proximity-based Services identified use cases and scenarios that could be provided by the 3GPP LTE system based on UEs being in proximity of each other.

The normative RAN work on enabling Proximity Services was started in LTE Rel.12 with focus on Public Safety applications. The following major features were standardized in LTE Rel.12:

Device-to-device discovery in network coverage (both Commercial and Public Safety use cases).

Device-to-device broadcast communication, with higher layers supporting groupcast and unicast communication for within/partial and out of network coverage scenarios mainly targeting Public Safety use cases.

The work on Public Safety services continued in LTE Rel.13 to enable: Type-1 discovery for the partial and outside network coverage scenarios; the L3-based UE-to-Network relaying reusing LTE Rel.12 D2D communication; and basic priority handling mechanisms for D2D communication.

There is a lot of interest to use LTE technology to connect and manage low cost MTC devices. One important example of such low cost devices are wearables, which also have the benefit of almost always being in close proximity to a smartphone that can serve as a relay. In this SI we aim to study the application of D2D, including non-3GPP short-range technologies, to such devices. In particular there are two main aspects to be further enhanced in LTE technology to enable D2D aided wearable and MTC applications:

Enhancement of UE-to-Network relaying functionality. The UE-to-Network relaying architecture in ProSe does not differentiate the traffic of the Remote UE from that of the Relay UE in the access stratum. This model limits the ability of the network and the operator to treat the Remote UE as a separate device, e.g. for billing or security. In particular, the 3GPP security associations never reach end-to-end between the network and the Remote UE, meaning that the Relay UE has clear text access to the Remote UE's communications. UE-to-Network relaying should be enhanced to support end-to-end security through the relay link, service continuity, E2E QoS where possible, efficient operation with multiple Remote UEs, and efficient path switching between Uu and D2D air-interfaces. Relaying using D2D can also be based on non-3GPP technologies such as Bluetooth and Wi-Fi. Some enhancements such as service continuity can make relaying more attractive for such technologies in commercial use cases. This can be especially useful to wearables due to their usage patterns with proximity to the user's smartphone, as well as form-factor limitations that may make a direct Uu connection less practical (e.g. limits on battery size). Relaying can enable significant power savings for Remote UEs (that are getting their traffic relayed). This is especially true for deep coverage scenarios. One cost effective way of introduce relaying is to use unidirectional D2D links between remote devices and relay devices. In this case, the Relay UE is utilised to relay only uplink data from the Remote UE. The advantage of this approach is no additional RF capability for D2D reception is added to the Remote UE.

Enhancements to enable reliable unicast PC5 link to at least support low power, low rate and low complexity/cost devices. Low cost D2D devices can be enabled by reusing the ideas developed during NB-IoT (Narrow Band-IoT) and eMTC studies, e.g., the NB-IoT/eMTC uplink waveform can be reused for D2D. Such devices will potentially use a single modem for communicating with the Internet/cloud and for communicating with proximal devices. The current PC5 link design inherited from the broadcast oriented design driven by public safety use cases, represents a bottleneck that prevents low power and reliable D2D communication, due to lack of any link adaptation and feedback mechanisms. These shortcomings do not allow achieving target performance metrics for wearable and MTC use cases in terms of power consumption, spectrum efficiency, and device complexity. Reduced power consumption and low complexity are the key attributes of wearable and MTC use cases that are typically characterized by small form factors and long battery lifetime.

This study item aims to evaluate and study the benefits of enhanced UE-to-network relaying, and of using an enhanced form of the LTE sidelink air-interface, for D2D aided services focusing on wearable and MTC applications. In order to enable these use cases, the sidelink air-interface should be optimized for energy efficient communication supporting various data rates.

The objective of the study is to study enhancements to Prose UE-to-network relaying and to the LTE D2D framework for commercial and public safety applications such as wearable devices. It is assumed that evolved Remote UEs can support both WAN and D2D connection, and that evolved Remote UEs have 3GPP subscription credentials. The D2D connection is realized by either LTE sidelink or non-3GPP technology. All non-3GPP technologies should be considered transparent for generic relay architecture over them. The primary objective of the study is to address power efficiency for evolved Remote UEs (e.g. wearable devices). The study item will study following coverage scenarios:

Evolved Remote UE and evolved ProSe UE-to-Network Relay UE are EUTRAN in-coverage.

Evolved ProSe UE-to-Network Relay UE has a Uu connection to the eNB and evolved Remote UE can be in enhanced coverage (enhanced coverage implies that the UE is connecting to the network via NB-IOT or Rel-13 MTC in CE mode).

Evolved ProSe UE-to-Network Relay UE is in EUTRAN coverage and evolved Remote UE is out of coverage of EUTRAN.

Following is the list of objectives for the three identified coverage scenarios:

Study and evaluate a generic Layer 2 evolved UE-to-Network Relay architecture, including methods for the network to identify, address, and reach a evolved Remote UE via an evolved ProSe UE-to-Network Relay UE.

Study the possibility of a common solution supporting the following use cases

UE to network relaying over non-3GPP access (Bluetooth/WiFi).

UE to network relaying over LTE sidelink.

Unidirectional and bidirectional UE to network relay.

Investigate potential impacts to protocol stack, procedure and signalling mechanisms, such as authorization, connection setup, UE mobility, parameter configuration and security, allowing multiple evolved Remote UEs via an evolved ProSe UE-to-Network Relay UE.

Study path selection/switch between the cellular link (Uu air interface) and relay link and provide service continuity and QoS.

Study necessary LTE sidelink enhancements.

Introduce additional evaluation assumptions to the sidelink evaluation methodology focusing on analysis of wearable use cases.

Identify mechanisms to enable QoS, more efficient, reliable, and/or low complexity/cost & low energy sidelink.

Study additional co-existence issues with adjacent carrier frequencies that may arise due to the new mechanisms identified.

FDD, H-FDD and TDD should be considered for this work. The impact of sidelink operation on cellular traffic, spectrum and QoS of other cellular services are assumed to be fully controlled by the network. Co-existence with Rel-13 public safety devices in the same spectrum will be taken into account. There is no need of service continuity between Release 13 and Release 14 public safety UEs. So when (Evolved) Remote UE moves from ProSe UE-to-Network Relay to Evolved ProSe UE-to-Network Relay or vice versa there will be no service continuity.

CONTENTS RELATED TO THE PRESENT INVENTION

First of all, the background information about why an interactive method for transceiving a signal between a Remote UE and a Relay UE, as proposed in the present invention, will be briefly described, and the method proposed in the present invention will be explained later in more detail.

A Remote UE(s) or a Relay UE(s) used in the present invention may be interpreted as representing one or more UEs. In addition, a Remote UE and a Relay UE may include Remote UEs and Relay UEs, respectively.

Remote UEs attempting to connect to a Relay UE may miss a chance to select the finest (or the best) Relay UE among a plurality of candidate Relay UEs.

Thus, the present invention proposes using an interactive method for obtaining a feedback from a Relay UE about availability information of its own (e.g., information about how many Remote UEs are attempting to connect to the Relay UE, information about a channel state of the Relay UE with the Remote UE, information about the current traffic load in the Relay UE, etc.)

Hereinafter, detailed methods therefor will be described.

Method 1

Method 1 is a method in which a Relay UE uses a predefined calculation rule to generate a scalar value to be transmitted to each Remote UE.

The scalar value is a parameter used by a Remote UE to determine a Relay UE.

At first, the Remote UE transmits the following information to neighboring UEs including the Relay UE. When the Remote UE is in a connected mode with respect to the Relay UE, the Remote UE may use a PC5 interface to broadcast or unicast a request.

Information provided by the Remote UE:
Amount of data of the Remote UE (e.g., buffer size information)
Remaining battery power or energy of the Remote UE
Expected residual lifetime of the Remote UE (when transmission is in progress, when transmission is dormant, etc.)

Next, as receiving the above information from the Remote UE, the Relay UE calculates a score (a scalar value) to determine a particular UE. Specifically:
Amount of data of the Remote UE
Remaining battery power of the Remote UE
Information about a channel between the Remote UE and the Relay UE measured by the Relay UE
Power available in the Relay UE
Load information of the Relay UE The load information of a Relay UE is information indicating a load state of the Relay UE dependent upon the number of Remote UEs assessed by the Relay UE.

If it is supposed that the calculated score having a greater value indicates a likelihood that the Relay UE is preferred more, some or all of the aforementioned information may contribute to the score.

For example, in the case where specific information contributing to the score is load information, if the load of the Relay UE is high, the score may have a small value.

Next, the Relay UE may transmit the calculated score (or a scalar value) to the Remote UE again.

The Relay UE may provide modulation and coding scheme (MCS) level information which is used by the Remote UE to transmit data.

Next, the Remote UE selects a Relay UE having the highest score value.

Next, using the MCS level information, the Remote UE transmits data to the Relay UE selected at the previous step where an MSC level is provided.

As another method, a method of calculating the aforementioned score or scalar value will be described on the side of a Remote UE.

First, a Relay UE calculates an MCS level used to transmit data, based on information about 1) an amount of data of a Remote UE, 2) remaining battery power of the Remote UE, 3) a channel state between the Remote UE and the Relay UE measured by the Relay UE. The Relay UE may transmit the calculated MCS level to the Remote UE.

Nest, the Relay UE determines a score in accordance with the received MCS level. If the Relay UE transmits the calculated MCS level to the Remote UE, the Remote UE may determine a score in accordance with the MCS level.

The following Table 1 can be used by the Relay UE or the Remote UE to determine a score in accordance with an MCS level.

TABLE 1

| MCS Level | Score | Normalized Score ($\alpha 1$) |
|---|---|---|
| MCS 0 | 1 | $1/(K + 1)$ |
| MCS 1 | 2 | $2/(K + 1)$ |
| — | — | — |
| MCS K | $(K + 1)$ | 1 |

Apart from the MCS level, the Remote UE or the Relay UE may determine a score based on power available in the Relay UE.

That is, the score may be determined based on a relationship between a power level and a score, as shown in the following Table 2.

TABLE 2

| Power Level | Score | Normalized Score ($\alpha 2$) |
|---|---|---|
| Level 0: $0 < P_L \leq P_0$ | 1 | $1/(M + 1)$ |
| Level 1: $P_0 < P_L \leq P_1$ | 2 | $2/(M + 1)$ |
| — | — | — |
| Level M: Relay UE connected to power outlet | $(M + 1)$ | 1 |

If the Relay UE determines a score based on an MCS level and its power level, the Relay UE may transmit, to the Remote UE, a sum of scores (SN=a1+a2) which are normalized with reference to Tables 1 and 2.

In addition to the scoring shown in Tables 1 and 2, a scoring according to the MCS level or the power level may be defined as $2^{(k-1)}$. Here, k=1, 2, 3, ..., (M+1).

That is, each score of level 0, level 1, level 2, ..., and level M corresponds to $2^0$, $2^1$, $2^2$, ..., $2^{(M+1)}$, respectively.

In addition, the above scoring methods can be applied to all parameters used for determining a score as well as the MCS level and the Power level.

In another example, if the Remote UE receives the MCS level and power level of a Relay UE(s), the Remote UE may determine with reference to the above Tables 1 and 2.

In yet another example, when transmitting a score value or a parameter, used to determine a score, to the Remote UE, the Relay UE may transmit identity information of the Relay UE as well.

In yet another example, a resource(s) necessary for the Remote UE to transmit data may be pre-configured.

When receiving a sum of normalized scores from one or more Relay UEs, the Remote UE may determine a Relay UE having the highest score for transmission of data based on information provided by a selected Relay UE (e.g., Relay UE ID, allocated resources, etc.)

FIG. 6 is a flowchart illustrating an example of a method of calculating a score to determine a Relay UE, as proposed in the present invention.

Referring to FIG. 6, the above-described Method 1 will be briefly summarized. As shown in FIG. 6, it is assumed that there are two Relay UEs.

First, a Remote UE determines information for an amount of data to be transmitted, information for remaining power, etc. (S610), and transmits the determined information to Relay UE 1 and Relay UE 2 (S620).

At this point, the Remote UE may broadcast or multicast such information to the Relay UEs.

Next, each of the Relay UEs determines a score using the information received from the Remote UE and information for power available of itself (S630).

Next, each of the Relay UEs may transmit the determined score to the Remote UE in a unicast manner (S640).

Next, the Remote UE compares scores received from the Relay UEs to select a Relay UE having a higher score (S650).

Next, the Remote UE transmits data via the selected Relay UE (S660).

In FIG. 6, it is found that the Relay UE 1 is selected.

Method 2

Method 2 is a method of determining a Relay UE based on a score (or a scalar value) calculated using a predefined calculation rule and on load information related to a Remote UE.

That is, it is about a method in which a Relay UE generates a score to be transmitted to each Remote UE using a predefined calculation rule, and transmits not just the generated score but also load information, including the number of Remote UEs currently attempting to connect, to Remote UEs.

First, a Remote UE transmits the following information to a Relay UE or a neighboring UE. In this case, when the Remote UE is in a connected mode with respect to the Relay UE, the Remote UE is able to use a PC5 interface to broadcast or unicast a request.

Information provided by the Remote UE:
  Amount of data of the Remote UE (e.g.: buffer size information)
  Remaining battery power or energy of the Remote UE
  Expected residual lifetime of the Remote UE (When transmission is in progress, when transmission is dormant, etc.)

Then, using the information received from the Remote UE, the Relay UE calculates a score (or a scalar value) to determine a Relay UE.

That is, information used by the Relay UE to calculate the score is as below.
  Amount of data of the Remote UE
  Remaining battery power of the Remote UE
  Information about a channel between the Remote UE and the Relay UE measured by the Relay UE
  Power available in the Relay UE Next, the Relay UE calculates the number of Remote UEs (indicated as "N") which are attempting to connect or which are currently connected.

Next, the Relay UE transmits the calculated score and a value of N to the Remote UE.

In addition, the Relay UE may provide the Remote UE with MCS level information capable of being used for the Remote UE to transmit data.

Next, the Remote UE may select a Relay UE to transmit data, based on the received score and the received value of N.

Next, the Remote UE transmits data to a selected Relay UE which has provided an MCS level.

FIG. 7 is a flowchart illustrating another example of a method of calculating a score to determine a Relay UE, as proposed in the present invention.

The above-described Method 2 will be briefly summarized with reference to FIG. 7. It is assumed that there is only two Relay UE, as in the example of FIG. 7.

Steps S710 to S730 are the same as Steps S610 to S630 in FIG. 6, and thus, only distinctive features will be described herein.

After Step S730, each Relay UE (Relay UE 1 and Relay UE 2) stores the number of Remote UEs (a value of N) which are attempting to connect or which is currently connected (S740).

Next, each Relay UE transmits the stored value of N and the score value calculated at step S730 to the Remote UE (S750).

Next, the Remote UE determines a particular Relay UE based on the received value of N and the calculated score value (S760).

Next, the Remote UE transceives data with respect to the determined particular Relay UE (S770).

As another embodiment, a method of utilizing priority-related information to calculate a score will be described.

The priority may indicate a priority level of a traffic type, such as emergency, multimedia/video streaming, etc.

Thus, the Remote UE may transmit a priority-related traffic type to a Relay UE in order to utilize priority in calculating a score.

The priority level of each traffic type may be pre-defined or may be determined by a UE.

More specifically, a method of calculating a score based on a priority level will be described.

At first, to express a congestion level or a priority level of each traffic type, M-ary expressions having (K+1) number of different priority levels may be considered.

In this case, K denotes a congestion level or priority level of a certain traffic type when the traffic type is being served.

That is, the antilogarithm of M may represent (K+1) number of congestion states.

Equation 1 as below shows an example in which the antilogarithm of M represents (K+1) number of congestion states.

$$
\begin{aligned}
&0: (value\_0) * M^{\wedge}(K) \\
&1: (value\_1) * M^{\wedge}(K-1) \\
&2: (value\_2) * M^{\wedge}(K-2) \\
&\ldots \\
&K: (value\_k)
\end{aligned}
\qquad \text{[Equation 1]}
$$

In the above Equation 1, each coefficient (value_0, value_1, ..., value_k) is a value indicating a congestion state of each priority level k (k=0, 1, 2, ..., K).

That is, a coefficient in an M-ary expression may indicate a priority level for each traffic type.

If a congestion state of each priority level k is high, a coefficient may be M−1 (that is, having a high value). If a congestion state of each priority level k is low, a coefficient may have a small value. If there is no congestion in each priority level k, a coefficient may have a value of 0. These are merely exemplary, and these values of coefficient may be changed to or expressed as different values.

That is, a Relay UE transmits information expressed in M-ary (sequenced values) to a Remote UE. The Remote UE compares the information received from one or more Relay UEs with a priority level of its own traffic type, and selects a particular Relay UE.

Take an example in which M=2, K=5.

A Relay UE transmits a 6 bit long binary sequence to a Remote UE.

If the 6 bit long binary sequence transmitted by the Relay UE 1 is set to "100000", this may mean that the highest priority is being occupied (or traffic having the highest priority level is being transmitted) and other traffic types with lower priority levels are not being transmitted.

In addition, if the 6 bit long binary sequence transmitted by the Relay UE 2 is set to "011111", this may mean that a traffic type with the highest priority level is not being transmitted and other traffic types with lower priority levels are being transmitted.

The Relay UE 2 seems more congested in terms of a total amount of traffic. Yet, if the Remote UE wishes to transmit the highest priority-level traffic, the Remote UE may select the Relay UE 2 because the Relay UE 2 is serving traffic with priority levels lower than a priority level of traffic being served by the Relay UE 1 even though the Relay UE 2 is serving a greater amount of traffic than the Relay UE 1.

As described above, it is expressed in binary if M=2, it is expressed in octal if M=8, and it is expressed in decimal if M=10.

In each expression, a coefficient indicates a priority level of a traffic type.

For example, if a coefficient of the first term (the highest priority level or class) in an expression is "0", it may indicate that a corresponding traffic type is not being served by a Relay UE.

If the corresponding traffic type is being served but relatively less congested, the coefficient of the first term may have a low value.

If the coefficient of the first term has a value of (M−1), it means that a traffic type corresponding to the coefficient has a high priority level, and this may be interpreted such that a Relay UE is not able to accommodate any connection attempt any longer (that is, a completely congested state).

As described above, information expressed in M-ary may be transmitted to a Remote UE by a Relay UE.

In order to select a Relay UE, each Remote UE may check information received from different Relay UEs (if a plurality of neighboring UEs exist, only one Relay UE may exist or all the neighboring UEs may not be Relay UEs).

Then, the Remote UE compares a priority level transmitted by the Relay UE with a priority level of traffic that the Remote UE needs to transmit.

At this point, the Remote UE may check information about whether a priority level of each Relay UE is being served.

If the Remote UE has traffic with a priority level higher than a priority level of any different traffic being served by the Relay UE, the Remote UE may select the Relay UE and attempt to connect to the selected Relay UE because, even though the Relay UE seems congested, this congestion is caused by the low priority-level traffic.

Take another example in which M=2, K=3.

Suppose that a Remote UE has traffic with the highest priority level.

Suppose that the Relay UE 1 transmits "1000" to a Remote UE and the Relay UE 2 transmits "0111" to the Remote UE.

As the Relay UE 2 serves a priority level two steps lower than a priority level being served by the Relay UE 1, the Relay UE 2 seems more congested than the Relay UE 1.

However, the Remote UE selects the Relay UE 2.

It is because the Relay UE 2 pre-empts a lower priority-level traffic and thus afford to accommodate a higher priority-level traffic.

As yet another embodiment, a method in which a Relay UE transmits two types of information (information to be transmitted in a broadcast manner, and information to be transmitted in a unicast manner) to a Remote UE in different manners will be described.

Specifically, a Relay UE may transmit the above-described priority-related information in a broadcast manner, and other Remote UE-specific information in a unicast manner.

For example, by using a Random Access Response (RAR), a Relay UE may transmit a particular value to a particular UE and a different value to a different UE.

For example, the information to be transmitted in a broadcast manner may be serving state information about a priority level and a backhaul link state of each neighboring Remote UE.

In another example, a Relay UE may transmit only broadcast data to a Remote UE without the Relay UE-specific information (the Relay UE does not receive even any feedback on such information).

However, the Relay UE may pre-agree with the Remote UE about a scoring mechanism for calculating the above-described score.

In this case, the Remote UE is already aware of its current state. Thus, the Remote UE calculates a score based on the pre-agreed scoring mechanism to determine a particular UE, and determines the particular Relay UE using the calculated score.

In this case, information related to the current state of the Remote UE may be, for example, battery power information and buffer status information.

In another example, the Relay UE may determine (or express the intent of) whether or not to serve the Remote UE, and transmit information about the determination (of the intent) to the Remote UE.

The information about the determination may be transmitted by the Relay UE to the Remote UE after the Relay UE calculates a score by itself.

In this case, the Relay UE does not need to additionally transmit information about the above-described score to the Remote UE.

Hereinafter, how a Remote UE and a Relay UE operate to determine a Relay UE which will transceiver data with resect to the Remote UE will be described in more detail based on the above description with reference to FIGS. 8 and 9.

FIG. 8 is a flowchart illustrating an example of a method in which a Relay UE operates to determine a Relay UE so as to perform an interactive operation between the Remote UE and the Relay UE, as proposed in the present invention.

At first, a Relay UE determines whether or not to serve a connection request for a Remote UE, using at least one of first control information related to the current state of the Relay UE, second control information indicative of a type of traffic supported by the Relay UE, or third information indicative of the current load state of the Relay UE (S810).

The first control information may include at least one of information for a channel state with the Remote UE, information for power available in the Relay UE, or information for a link state with a base station.

The second control information nay further include information indicative of a priority level of each traffic type.

The third control information may include at least one of information about the number of Remote UEs currently connected the Relay UE or information about the number of Remote UEs attempting to connect to the Relay UE for a particular period of time.

Next, the Relay UE transmits the determination result to at least one Remote UE (S820).

First, the determination result may be information indicating whether or not to serve the request for the Remote UE.

Second, the determination result may be a score (or a scalar value) used to determine a particular Relay UE.

The score may be a value that is calculated by applying a priority level and a weight to each parameter included in the first control information, the second control information, and the third control information, or to each of the first control information, the second control information, and the third control information.

The greater the calculated score, the higher the priority level given to determine the particular Relay UE.

Third, the determination result may be a bit sequence, and may includes a priority class of a traffic type(s) and a priority level of each priority class.

For example, the most outer left bit in a bit sequence may correspond to the highest priority class.

That is, the most outer left bit in the bit sequence may represent a traffic type with the highest priority level.

If bits have the same priority class, priority among the bits may be determined by comparing the bits' priority levels.

In this case, the priority levels may be expressed as a value of each bit.

In addition, the priority level may be broadcast to at least one Remote UE.

Furthermore, the Relay UE may receive, from at least one Remote UE, fourth control information including at least one of information for an amount of data to be transmitted or information for remaining battery power.

In this case, the Relay UE may determine whether or not to serve a connection request for the Remote UE, using at least one of the first control information, the second control information, the third control information, or the fourth control information.

FIG. 9 is a flowchart illustrating an example of a method in which a Remote UE operates to determine a Relay UE so as to perform an interactive operation between the Remote UE and the Relay UE, as proposed in the present invention.

First, a Remote UE receives particular information related to a connection request from at least one Relay UE (S910).

Next, based on the received particular information, the Remote UE determine a particular Relay UE to transceiver a signal (S920).

The particular information may include at least one of first control information related to the current state of a Relay UE, second control information indicating a type of traffic supported by the Relay UE, or third information indicating the current load state of the Relay UE.

In FIG. 9, the first control information may include at least one of information for a channel state with the Remote UE measured by the Relay UE, information for power available in the Relay UE, or information for a link state between the Relay UE and a base station.

In addition, the third control information may include at least one of information about the number of Remote UEs currently connected to the Relay UE or information about the number of Remote UEs attempting to connect to the Relay UE for a particular period of time.

First, the particular information may be information indicating whether or not to serve a connection request for the Remote UE.

Second, the particular information may indicate a score (or a scalar value) which is used to determine a particular Relay UE.

The score may be calculated by applying a priority and a weight to each information included in the first control information, the second control information, and the third control information, or to each of the first, second, and third information.

The particular information may include a priority level that is represented as a bit sequence.

The particular information may be a bit sequence, and may include a priority class of a traffic type(s) and a priority level of each priority class.

For example, the most outer left bit in a bit sequence may correspond to the highest priority class.

That is, the most outer left bit in the bit sequence may represent a traffic type with the highest priority level.

If bits have the same priority class, priority among the bits may be determined by comparing the bits' priority levels.

In this case, the priority level may be expressed as a value of each bit.

In addition, the priority level may be broadcast to at least one Remote UE.

Furthermore, the Relay UE may receive, from at least one Remote UE, fourth control information including at least one of information for an amount of data to be transmitted or information for remaining battery power.

In this case, the Relay UE may determine whether or not to serve a connection request for the Remote UE, using at least one of the first control information, the second control information, the third control information, or the fourth control information.

FIG. 10 is a block diagram illustrating a wireless device in which methods as proposed herein may be implemented.

In this case, the wireless device may be a BS, UE, WT, AP, MME or a network entity.

As shown in FIG. 10, the network entity 1010 and the UE 1020 include communication units (transmitting/receiving units, RF units (or RF module), 1013 and 1023), processors 1011 and 1021, and memories 1012 and 1022.

The network entity and the UE may further input units and output units.

The communication units 1013 and 1023, the processors 1011 and 1021, the input units, the output units, and the memories 1012 and 1022 are operatively connected with each other in order to conduct the methods as proposed herein.

The communication units (transmitting/receiving units or RF units, 1013 and 1023), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1011 and 1021 implement functions, procedures, and/or methods as proposed herein. The layers of radio interface protocols may be implemented by the processors.

The processors may be represented as control parts, controllers, control units, or computers.

The memories 1012 and 1022 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a baseband circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the procedure of transceiving a wake-up signal as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

FIG. 11 illustrates a block diagram of a wireless device according to an example of the present specification.

Specifically, FIG. 11 illustrates the terminal (UE) of FIG. 10 in detail.

Referring to FIG. 11, the UE may include a processor (or a digital signal processor (DSP) 1110, a radio frequency (RF) module (or an RF unit) 1135, a power management module 1105, an antenna 1140, a battery 1155, a display 1115, a keypad 1120, a memory 1130, a subscriber identification module (SIM) card 1125 (this element is optional), a speaker 1145, and a microphone 1150. The UE may also include a single antenna or multiple antennas.

The processor 1110 implements the functions, processes and/or methods proposed in FIGS. 1 to 9 described above. A layer of a radio interface protocol may be implemented by the processor 1110.

The memory may be connected to the processor 1110 and stores information related to an operation of the processor 1110. The memory 1130 may be present within or outside the processor 1110 and may be connected to the processor 1110 by a well known unit.

A user may input command information such as a phone number, or the like, by pressing (or touching) a button of the keypad 1120 or by voice activation using the microphone 1150. The processor 1110 receives the command information and performs an appropriate function such as making a call, or the like. Operational data may be extracted from the SIM card 1125 or the memory 1130. Also, the processor 1110 may display command information or driving information on the display 1115 for user recognition or for user convenience.

The RF module 1135 is connected to the processor 1110 and transmits and/or receives an RF signal. The processor 1110 delivers command information to the RF module 1135 in order to initiate communication, for example, in order to transmit a wireless signal forming voice communication data. The RF module 1135 includes a receiver and a transmitter to receive and transmit a wireless signal. The antenna 1140 serves to transmit and receive a wireless signal. When a wireless signal is received, the RF module 1135 delivers the signal and converts the signal to a baseband signal so as to be processed by the processor 1110. The processed signal may be converted into an audible or readable information output through the speaker 1145.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

Examples in which the method for transmitting and receiving a wake-up signal in a wireless communication system according to an embodiment of the present invention has been applied to 3GPP LTE/LTE-A/LTE-Pro/New Rat systems have been described, but the method may be applied to various wireless communication systems in addition to the 3GPP LTE/LTE-A/LTE-Pro/New Rat systems.

What is claimed is:

1. A method for transmitting a signal in a wireless communication system supporting a Relay UE, the method performed by the Relay UE comprising:
    determining whether or not to serve a connection request for a Remote UE using at least one of first control information related to a current state of the Relay UE, second control information indicating a type of traffic to be supported, and third information indicating a current load state of the Relay UE; and
    transmitting the determination result to at least one Remote UE,
    wherein the first control information includes at least one of information for a channel state with the Remote UE, information for power available in the Relay UE, or information for a link state with a base station,
    wherein the third control information includes at least one of information for the number of currently connected Remote UEs or information for the number of Remote UEs attempting to connect for a specific time,
    wherein the determination result is a score value,
    wherein the score value is calculated by applying a priority and a weight to each information included in the first control information, the second control information, and the third control information, or
    wherein the score value is calculated by applying a priority and a weight to each of the first control information, the second control information, and the third control information.

2. The method of claim 1, wherein the determination result indicates that the Relay UE can serve or cannot serve the connection request of the Remote UE.

3. The method of claim 1, wherein the higher the calculated score, the higher the priority.

4. The method of claim 1, wherein the result of determination includes a priority level represented by a bit string.

5. The method of claim 4, wherein a first bit of the bit string has the highest priority level and the priority level is lower from the next bit.

6. The method of claim 4, wherein the priority level is broadcast to the at least one Remote UE.

7. The method according to claim 1, further comprising:
    receiving, from the at least one Remote UE, fourth control information including at least one of information for an amount of data to be transmitted or information for remaining battery power.

8. The method of claim 7, wherein the determining whether or not to serve the connection request for the Remote UE uses at least one of the first control information, the second control information, the third control information, or the fourth control information.

9. A method for transmitting a signal in a wireless communication system supporting a Relay UE, the method performed by a Remote UE, the method comprising:
    receiving specific information related to a connection request from at least one Relay UE; and
    determining a specific Relay UE to transceive the signal based on the received specific information,
    wherein the specific information includes at least one of first control information related to a current state of the Relay UE, second control information indicating a type of traffic supported by the Relay UE, or third information indicating a current load state of the Relay UE,
    wherein the first control information includes at least one of information for a channel state with the Remote UE measured by the Relay UE, information for power available in the Relay UE, or information for a link state between the Relay UE and a base station,
    wherein the third control information includes at least one of information for the number of Remote UEs currently connected to the Relay UE or information for the number of Remote UEs attempting to connect to the Relay UE for a specific time,
    wherein the specific information is a score value,
    wherein the score value is calculated by applying a priority and a weight to each information included in the first control information, the second control information, and the third control information, or
    wherein the score value is calculated by applying a priority and a weight to each of the first control information, the second control information, and the third control information.

10. The method of claim 9, wherein the specific information is information indicating that the Relay UE can serve or can not serve the connection request of the Remote UE.

11. The method of claim 9, wherein the specific information includes a priority level represented by a bit string.

12. The method of claim 9, further comprising:
    transmitting, to the at least one Relay UE, fourth control information including at least one of information for an amount of data to be transmitted or information for remaining battery power.

13. The method of claim 12, wherein the specific information is determined using at least one of the first control information, the second control information, the third control information, or the fourth control information.

14. A Relay user equipment (UE) for transmitting a signal in a wireless communication system, the Relay UE comprising:
    a radio frequency (RF) module configured to communicate with the outside in a wireless or a wired manner; and
    a processor functionally connected to the RF module, wherein the processor is configured:
    to determine whether or not to serve a connection request for a Remote UE using at least one of first control information related to a current state of the Relay UE, second control information indicating a type of traffic to be supported, and third information indicating a current load state of the Relay UE; and
    to transmit the determination result to at least one Remote UE,
    wherein the first control information includes at least one of information for a channel state with the Remote UE, information for power available in the Relay UE, or information for a link state with a base station,
    wherein the third control information includes at least one of information for the number of currently connected Remote UEs or information for the number of Remote UEs attempting to connect for a specific time,
    wherein the determination result is a score value,
    wherein the score value is calculated by applying a priority and a weight to each information included in the first control information, the second control information, and the third control information, or
    wherein the score value is calculated by applying a priority and a weight to each of the first control information, the second control information, and the third control information.

* * * * *